(12) United States Patent
Ayers et al.

(10) Patent No.: US 9,068,867 B2
(45) Date of Patent: Jun. 30, 2015

(54) ANGLED PORT DIFFERENTIAL PRESSURE FLOW METER

(75) Inventors: Jared Steven Ayers, Menifee, CA (US); Gerald E. Davis, Hemet, CA (US); Clinton Paul Hobbs, Hemet, CA (US); Eric Dahl Mikkelsen, Hemet, CA (US)

(73) Assignee: McCrometer, Inc., Hemet, CA (US)

( * ) Notice: Subject to any disclaimer, the term of this patent is extended or adjusted under 35 U.S.C. 154(b) by 132 days.

(21) Appl. No.: 13/607,193

(22) Filed: Sep. 7, 2012

(65) Prior Publication Data

US 2014/0069209 A1    Mar. 13, 2014

(51) Int. Cl.
| | |
|---|---|
| G01F 1/37 | (2006.01) |
| G01F 1/36 | (2006.01) |
| G01F 1/40 | (2006.01) |
| G01F 1/46 | (2006.01) |
| G01F 1/50 | (2006.01) |

(52) U.S. Cl.
CPC .. G01F 1/36 (2013.01); G01F 1/40 (2013.01); G01F 1/46 (2013.01); G01F 1/50 (2013.01)

(58) Field of Classification Search
USPC ................ 73/861.63, 861.42, 861.52, 861.04
See application file for complete search history.

(56) References Cited

U.S. PATENT DOCUMENTS

| | | | |
|---|---|---|---|
| 5,814,738 A | 9/1998 | Pinkerton et al. | |
| 6,502,467 B1 * | 1/2003 | Fincke | 73/861.63 |
| 8,136,410 B2 | 3/2012 | Hobbs et al. | |
| 8,136,414 B2 | 3/2012 | Steven | |
| 2008/0245158 A1 | 10/2008 | Hedtke | |
| 2010/0191481 A1 * | 7/2010 | Steven | 702/47 |
| 2010/0224009 A1 * | 9/2010 | Steven | 73/861.42 |
| 2011/0138929 A1 * | 6/2011 | Young | 73/861.42 |
| 2011/0259119 A1 * | 10/2011 | Steven | 73/861.42 |
| 2014/0069208 A1 * | 3/2014 | Ayers et al. | 73/861.42 |

FOREIGN PATENT DOCUMENTS

| | | |
|---|---|---|
| DE | 4015107 A1 | 11/1991 |
| GB | 2453704 | 2/2011 |

OTHER PUBLICATIONS

International Search Report for Application PCT/US2012/069263, May 9, 2013, 3 pages, European Patent Office, The Hague, Netherlands.
Wolfgang Nitsche et al., "Messung des Wanddruckes", Stroemungsmesstechnik, Springer, No. 2. aktualisierte and bearb. Aufl, Jan. 1, 2006, XP009174369, ISBN: 3-540-20990-5 (7 pages).
Rambaud, Dilek, International Preliminary Report on Patentability, PCT/US20121069263, European Patent Office, Rikswijk, 2015 (5 pages).

* cited by examiner

Primary Examiner — Jewel V Thompson
(74) Attorney, Agent, or Firm — Ference & Associates LLC

(57) ABSTRACT

An aspect provides a flow metering apparatus, comprising: a fluid conduit having a differential pressure producer therein; at least one pressure port angled between 0 and 90 degrees in a wall of the fluid conduit; and at least one other pressure port; wherein the at least one pressure port and the at least one other pressure port provide pressure signals. Other aspects are described and claimed.

11 Claims, 3 Drawing Sheets

ANGLED PORT DIFFERENTIAL PRESSURE FLOW METER

BACKGROUND

Flow meters are important in many applications, such as oil and gas pipeline flow monitoring. It is important for economic and safety reasons to have accurate flow measurements. Differential pressure flow meters are commonly used. A differential flow meter is based on Bernoulli's theorem and the conservation of mass of a fluid flow between two points in a flow, and can provide a flow rate reading (in mass or volume) expressed as a function of measured differential pressure and the fluid density.

A differential pressure meter measures a pressure drop produced using a differential pressure producer, such as an obstruction body or constriction introduced into the fluid flow. The differential pressure meter provides a flow rate calculated using known flow rate equations. For its part, the differential pressure producer may be either a constriction formed in the conduit or an obstruction body inserted into the conduit. Examples of differential pressure meters include the McCrometer WAFER CONE flow meter and the McCrometer V CONE flow meter, which operate using obstructions. V CONE and WAFER CONE are registered trademarks of McCrometer in the United States and other countries.

In order to measure pressure differential within a conduit, pressure tappings or ports are configured both upstream from the obstruction and at or in the vicinity of the obstruction in order to produce high and low pressure readings. The differential in pressure between the two pressure points is monitored and used for flow rate calculations. The standard DP meter flow equation is well known.

BRIEF SUMMARY

In summary, one aspect provides a flow metering apparatus, comprising: a fluid conduit having a differential pressure producer therein; at least one pressure port angled between 0 and 90 degrees in a wall of the fluid conduit; and at least one other pressure port; wherein the at least one pressure port and the at least one other pressure port provide pressure signals.

Another aspect provides a flow metering apparatus, comprising: a fluid conduit having an obstruction body therein; a first pressure port located in a wall of the fluid conduit downstream of the obstruction body; a second pressure port located in the wall of the fluid conduit at a position other than the location at which the first pressure port is located; and wherein either the first pressure port or the second pressure port is angled between 0 and 90 degrees in the wall of the fluid conduit.

A further aspect provides a flow metering method, comprising: providing a differential pressure producer in a fluid conduit; providing at least one pressure port angled between 0 and 90 degrees in a wall of the fluid conduit; and providing at least one other pressure port; wherein the at least one pressure port and the at least one other pressure port provide pressure signals.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

Measuring differential pressure in a conduit produced using an obstruction or constriction (hereinafter collectively "differential pressure producer") and estimating flow with a differential pressure meter is known. Consequently, the various algorithms and processing associated therewith are known to those having ordinary skill in the art and a description of these measurement algorithms and principles is omitted for the sake of brevity. Information regarding differential pressure meters and techniques of using the same may be found in: U.S. Pat. No. 5,814,738; and U.S. Patent Pub. No. 2011/0259119, the entire contents of which are incorporated by reference here.

Figure 1:
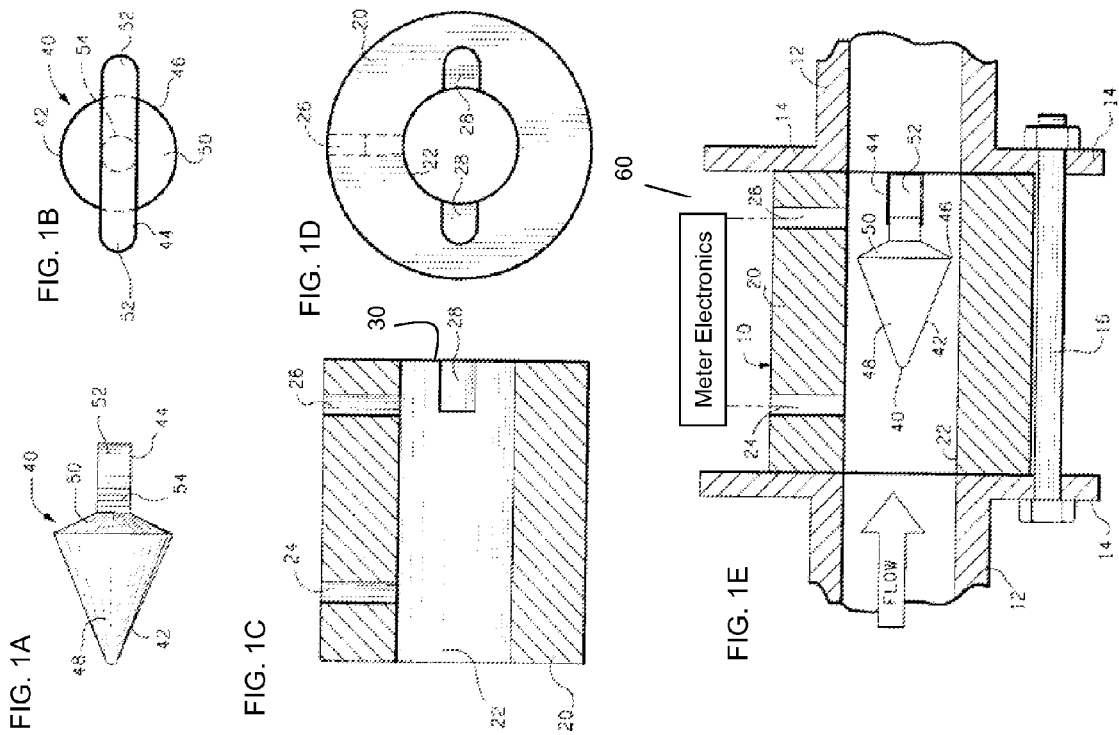
FIG. 1 illustrates a conventional differential pressure flow meter.

In one example flow metering apparatus 10, illustrated in FIG. 1(A-E), the flow meter is adapted to be installed in a pipeline or other fluid flow conduit 20 that is depicted as being comprised of pipe sections 12 having bolting flanges 14 at their ends. The flow meter 10 is comprised of a fluid flow displacement device 40 (obstruction body) mounted within the conduit 20. Although the example illustrated includes an obstruction body 40, it should be noted that a constriction may be used as a differential pressure producer. The flow meter of the illustrated example is a so-called wafer design, and is confined between the flanges 14 and centered or axially aligned with the pipe sections 12 by means of spaced bolts 16 (only one shown) extending between and interconnecting the flanges 14.

As indicated by the arrow, the direction of fluid flow is from left to right as viewed in the drawings. Longitudinally spaced perpendicular (with respect to the conduit 20 wall) pressure taps or ports 24 and 26 extend radially through the wall of the conduit 20 at the locations indicated (upstream, 24, downstream, 26) for measuring the pressure at the respective points, to be used in the differential pressure derivation. As shown in FIGS. 1C and 1D, the interior wall of the conduit 20 is provided, at the rearward or downstream end thereof, with a plurality of spaced recesses or grooves 28.

Referring to FIGS. 1A and 1B, the fluid flow displacement device 40 is comprised of a flow conditioning portion or cone shaped obstruction body or member 42 and a supporting or mounting portion or member 44. The cone shaped obstruction body or member 42 is comprised of a body, which may be cylindrical or cone shaped, as illustrated, which has a major transverse diameter or dimension at edge 46 and two oppositely facing, usually conical, sloped walls 48 and 50 which face, respectively, in the upstream and downstream directions and which taper symmetrically inward toward the axis of the obstruction body or member 42. In the example flow meter of FIG. 1(A-E), the cone shaped obstruction body or member 42 has essentially the same physical characteristics and functions in essentially the same manner as other flow displacement members.

The cone shaped obstruction body or member 42 is of smaller size than the conduit 20 and is mounted within the bore 22 normal to the direction of fluid flow and with the sloped walls 48 and 50 spaced symmetrically inward from the interior or inner surface of the wall of the conduit 20. The larger and contiguous ends of the sloped walls are of the same size and shape and define at their juncture a sharp peripheral edge 46, the plane of which lies normal to the direction of fluid flow. The upstream wall 48 is longer than the downstream wall 50 and tapers inwardly to a point, or substantially a point or nose, at its upstream end. The wall is formed at an angle to the plane defined by the peripheral edge 46. The angle of the downstream wall 50 relative to the plane defined by the edge 46. The beta ratio of the obstruction body or member 42 relative to the inner diameter of the conduit 20 may be on the order of from about 0.4 up to about 0.94.

As fluid enters the inlet or upstream end of the conduit 20, the fluid is displaced or deflected by the upstream wall 48 of the obstruction body or member 42 into an annular region of progressively decreasing cross sectional area, to a minimum area at the plane of the peripheral edge 46. The fluid then flows into an annular region of progressively increasing area as defined by the downstream wall 50. As a consequence, the fluid flow is stabilized and conditioned both upstream and downstream from the obstruction body or member 42. In particular, the obstruction body or member 42 is effective to linearize fluid flow in the region between the obstruction body or member 42 and the wall of the conduit 20 and to flatten the velocity profile of fluid flow in the conduit both upstream and downstream from the obstruction body or member 42 over a predetermined range of flow rates.

For purpose of mounting the obstruction body or member 42 within the bore 22, the obstruction body or member 42 is provided with an integral mounting or support portion or member 44. Specifically, the obstruction body or member 42 is provided at one end thereof with a plurality of spaced outwardly extending projections or tongues 52 of the same number as and located at the same spacing as the recesses or grooves 28 in the conduit section 20. A cross bar 30 is located a short distance downstream from the sloped wall 50 and is united therewith by a cylindrical extension 54. The extension 54 may be of different lengths for different sizes and shapes of displacement members so as to locate the displacement member 40 properly relative to the pressure ports 24 and 26.

As is shown by comparison of FIGS. 1B and 1D, the tongues 52 match that of the grooves 28. Consequently, the displacement member 40 can be conveniently assembled within the conduit 20 simply by inserting the same into the downstream end of the conduit 20 or bore 22 thereof and causing the tongues 52 to seat firmly and securely within the grooves 28. Upon assembly in the pipe line, the flange 14 of the downstream pipe section 12 locks the tongues 52 in place in the grooves 28 and prohibits dislodgment or dislocation of the obstruction body or member 42 relative to the bore 22.

When assembled, the peripheral edge 46 of the displacement member is located intermediate to the two pressure ports 24 and 26 so that the ports are located on opposite sides of the area or plane 46 at which the fluid flow area is the smallest and the velocity of fluid flow is the greatest. This enables flow measurements via the pressure ports by means of conventional fluid flow measurement instrumentation (meter electronics 60) connected with the taps, as illustrated schematically in FIG. 1E.

The upstream measurement tap 24 is positioned to measure high pressure, and may be located within an area between the edge 46 and a point about two conduit diameters, i.e., about two times the diameter of the bore 22, upstream from the upstream end of the upstream sloped wall 48. A commonly chosen location is in the area immediately upstream from the pointed end of the wall 48, as illustrated in FIG. 1E, although the upstream pressure port may be located elsewhere, such as within the obstruction body or member 42, as further described.

The downstream tap 26 is positioned to measure low pressure, and may be located within the area between the edge 46 and a point about two conduit diameters downstream from the edge, although the downstream pressure port may be located elsewhere, such as within the support member 44, as further described herein. In particular, the obstruction body or member 42 is to be placed to create an area of contracted flow suitable for creating a measurable pressure drop within the conduit 20. Pressure measurements at these example locations, and the differential between the measured pressures, provide information from which flow conditions within the pipe line can be determined and measured by appropriate instrumentation 60, as depicted schematically in FIG. 1E.

Flow meters of the type illustrated in FIG. 1 (A-E) that operate on differential pressure readings have a number of worthwhile features, among which are the ease with which obstruction bodies or members 42 of different sizes may be exchanged, these may also be machined rather than welded, and may have a simple shape that incorporates flange faces which allows for easy bolting between flanges into a pipeline.

In some circumstances, however, an abrupt shift in the flow coefficient at moderately high Reynolds' numbers (for example, between the range 500,000-1,500,000) may occur. The flow coefficient is the proportionality constant that allows a user to convert measured differential pressure to a rate of flow. As far as a user is concerned, an abrupt shift in this value simply means an abrupt shift in meter accuracy, which is unsatisfactory. Rather than predicting occurrence and magnitude of this shift, conventional applications were limited by the maximum Reynolds' number. That limitation inhibits the utilization of such flow meters in certain circumstances.

Figure 2:
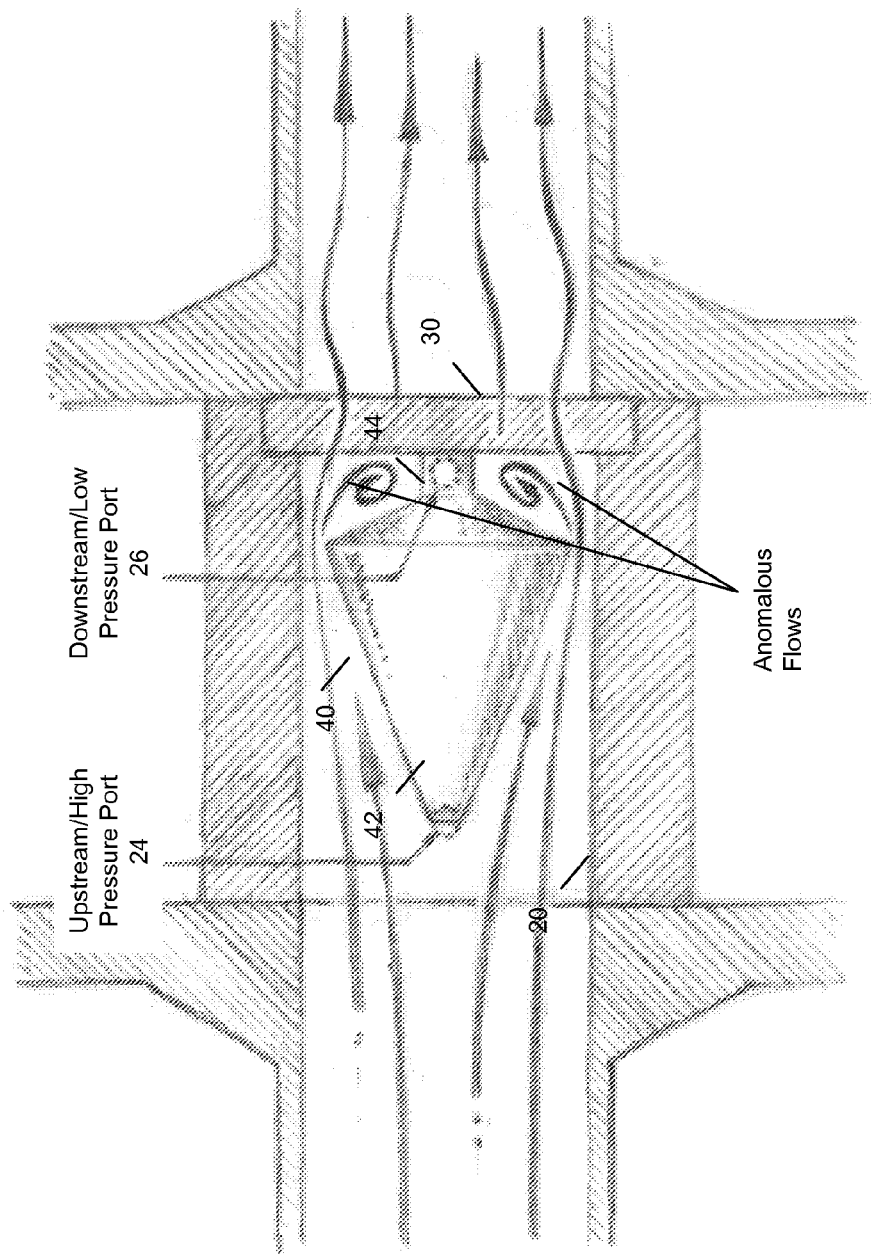
FIG. 2 illustrates an example anomalous flow of a differential pressure flow meter.

In a flow meter arrangement such as illustrated in FIG. 1 (A-E), the fluid flowing past the cone 42 encounters the cone support bar (30, FIG. 1C and FIG. 2) that attaches to the support member 44, which may induce an anomaly in the flow, as illustrated in FIG. 2. It is noted that FIG. 2 illustrates upstream/high pressure port 24 and downstream/low pressure port 26 as included in the obstruction body or member 42 and support member 44, respectively; however, the overall geometry of anomalous flow is commensurate across meter types employing obstruction bodies, such as that illustrated in FIG. 1(A-E), and thus the flows illustrated in FIG. 2 are equally applicable to other meter types.

The flow forms a re-circulating current between the back of the obstruction body or member 42 and the support bar 30. The support bar 30 is perpendicular to the axis of the obstruction body or member 42 and so creates a space within which this re-circulation takes place. The anomalous flows are probably usually present, but would vary in influence on the low-pressure signal depending upon the fluid velocity, above and below. That influence then would tend to increase at lower flows and diminish at higher flows. This is a very typical and problematic pattern for certain conventional meters. The flow coefficient tends to be low at low flows and higher at high flows, but the rate of that change is usually constant (that is, it tends to change gradually).

In some unusual instances, the influence of the anomaly changes abruptly rather than gradually. In such an instance, all of the change in flow coefficient that is usually distributed over the whole range of application flows could occur over a very small range. In those cases, there would be no way to extrapolate from a lower flow calibration to a higher flow to predict the final value of flow coefficient (which extrapolation and prediction can be done if the flow coefficient's rate of change is constant).

Figure 3:
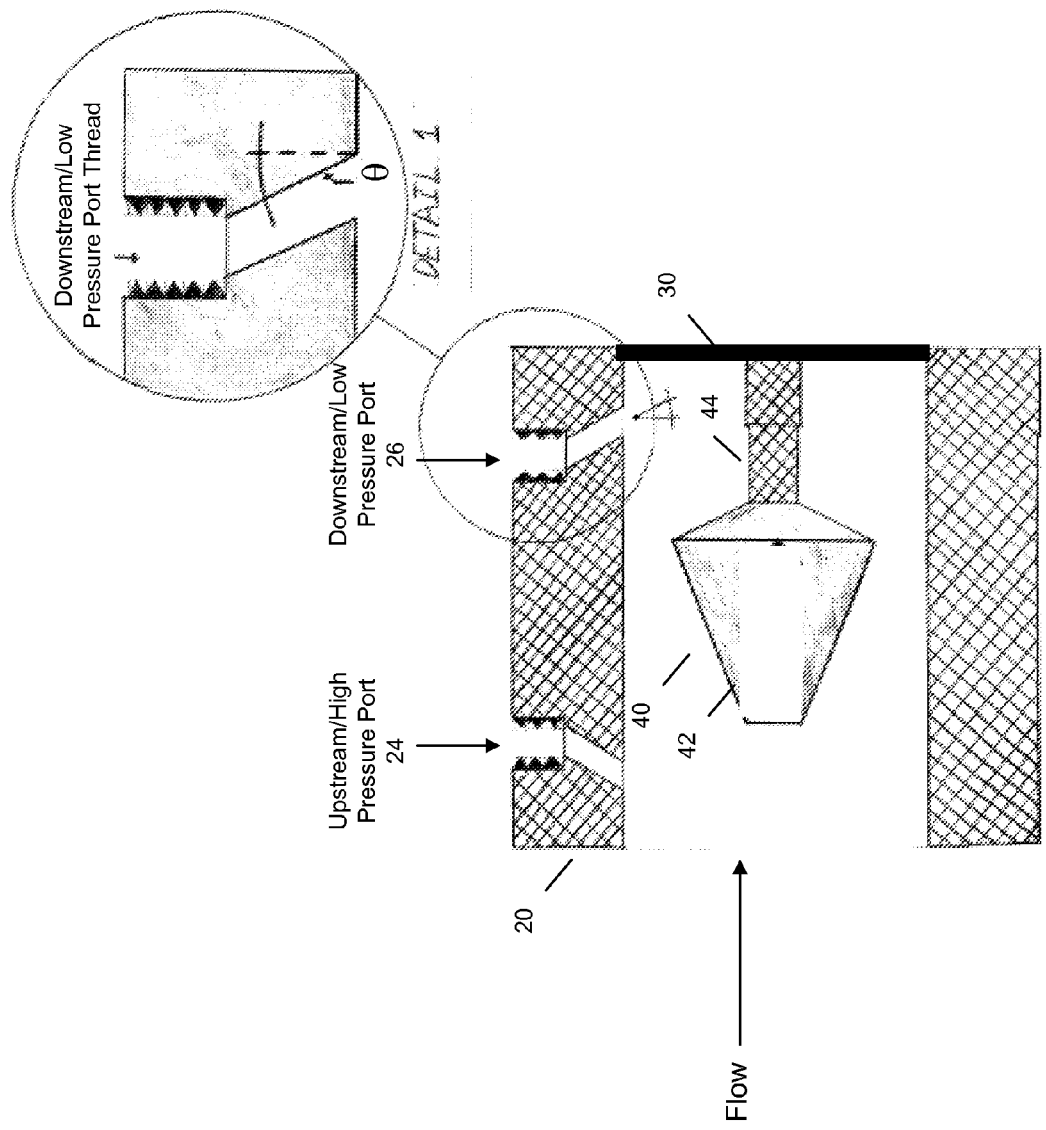
FIG. 3 illustrates an example angled port differential pressure flow meter.

Accordingly, as illustrated in FIG. 3, an embodiment provides a structure that avoids this problematic region. In an embodiment, pressure ports 24, 26 are provided (e.g. drilled into the conduit 20) at an angle θ so that the centerline of the ports are extended across the tube of flow in relatively undisturbed regions. While specific angles and ranges of angles are provided herein as examples, any angle may be chosen that provides the functionality described herein. Particularly, an angle that is less than 90 degrees but greater than 0 degrees may be used, or an angle between 15 degrees and 75 degrees may be used, or an angle between 30 and 50 degrees may be used. Providing such angled pressure ports 24, 26 allows for avoiding and thus discounting any potentially anomalous regions between the cone 42 and its support bar 30. This prevents for example a need to make the meter longer so that the downstream port is drilled downstream of the support bar 30, as that would deprive the meter of two features: a compact, simple shape; and an easily removed and replaced assembly.

Providing one or both of the pressure ports 24, 26 at an angle is both unorthodox and counterintuitive. In this regard, either or both ports 24, 26 may be angled towards appropriate regions of fluid flow to obtain high and low pressure readings. The orthodox understanding is that the pressure ports 24, 26 measure the static pressure at the pipe wall. Thus, providing the pressure ports 24 or 26 at an angle would not seem to give any particular effect to the pressure measurements, other than introducing possible impact effects. However, if the pressure measurement point is not at the pipe wall, but is instead extended across the tube of flow and reads the pressure along that line, that is, in effect, the pressure measurement "point" is the pressure gradient along that line, providing angled providing ports 24, 26 does provide a beneficial effect in such arrangements.

This is consistent with the description in connection with FIG. 1(A-E) and FIG. 2 herein regarding the influence of the anomalous flow just behind the obstruction body or member 42. In practice, flows occurring distant from the conduit 20 walls do have an effect on pressure measurements. Thus, maintaining perpendicular ports (as illustrated in FIG. 1(A-E)) is not as desirable as providing at least one pressure port at an angle with its centerline extending across the tube of flow (for example, downstream and towards the support member 44). This provides for a flow coefficient as constant as that for a conventional meter that does not experience anomalous flows. Accordingly, an embodiment including at least one angled port does not demonstrate any abrupt shifts in the flow coefficient vs. Reynolds' number curves.

Flow metering apparatuses may provide an upstream pressure port and a downstream pressure port at a variety of locations. For example, as illustrated in FIG. 1(A-E), the upstream and downstream pressure ports 24, 26 are both provided in the wall of the conduit 20. One or more angled ports 24, 26 may be provided in similar locations according to an embodiment. Alternatively, as illustrated in FIG. 2, the upstream pressure port and the downstream pressure port may be located in the obstruction body or member 42 (near the tip or nose of the cone) and the support member 44, respectively, or in some suitable combination of the foregoing. Angled pressure ports consistent with the embodiments described herein may be provided in lieu of one or more of these conventional pressure ports in order to avoid problematic/anomalous regions of flow. In other words, one or more angled ports are provided by an embodiment such that the angled ports provide pressure reading(s) from an appropriate region of fluid flow.

By providing at least a downstream pressure port 26 at an angle, anomalous flow created by a support structure for an obstruction body 40 may be avoided. Thus, appropriate pressure readings and signals may be provided to meter electronics (including a processor and a memory), which may process these signals to produce differential pressure measurements and flow estimates. The meter electronics may be integral to the flow meter assembly or may be provided via one or more separate components configured to receive pressure readings (a distributed system).

Additionally, one or more angled ports may be used in other contexts, such as described in co-pending and commonly owned U.S. patent application entitled "SELF-DIAGNOSING DIFFERENTIAL PRESSURE FLOW METER" Ser. No. 13/607,259, filed on concurrently herewith, which is incorporated by reference herein.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein, it is to be understood that the embodiments are not limited to those precise embodiments, and that various other changes and modifications may be affected therein by one skilled in the art without departing from the scope or spirit of the disclosure.

What is claimed is:

1. A flow metering apparatus, comprising:
   a fluid conduit having a cone shaped differential pressure producer therein;

a support member securing the cone shaped differential pressure producer to a wall of the fluid conduit;

at least one angled pressure port in a wall of the fluid conduit;

the at least one angled pressure port being angled downstream of the cone shaped differential pressure producer;

the angle of the of the at least one angled pressure port being selected such that the centerline of the at least one angled pressure port extends across the flow in a relatively undisturbed region; and at least one other pressure port;

wherein the at least one angled pressure port and the at least one other pressure port provide pressure signals.

2. The flow metering apparatus of claim 1, further comprising a component configured to read the pressure signals and produce a differential pressure reading.

3. The flow metering apparatus of claim 2, further comprising a processor configured to determine a flow rate of fluid in the fluid conduit using the differential pressure reading.

4. The flow metering apparatus of claim 1, wherein the at least one angled pressure port located downstream of the cone shaped differential pressure producer is angled at a low pressure region of the flow.

5. The flow metering apparatus of claim 1, wherein the at least one other pressure port is a pressure port in the fluid conduit wall located upstream of the cone shaped differential pressure producer.

6. The flow metering apparatus of claim 1, wherein the at least one other pressure port in the fluid conduit is angled greater than 0 degrees and less than 90 degrees at a high pressure region of the fluid flow.

7. A flow metering apparatus, comprising:

a fluid conduit having a cone shaped obstruction body therein;

a support member securing the cone shaped obstruction body to a wall of the fluid conduit;

a first angled pressure port located in a wall of the fluid conduit downstream of the cone shaped obstruction body and angled towards a relatively undisturbed region of flow past the cone shaped obstruction body; and a second pressure port located in the wall of the fluid conduit at a position other than the location at which the first angled pressure port is located;

wherein either the first angled pressure port or the second pressure port is angled between about 30 degrees and about 50 degrees in the wall of the fluid conduit.

8. The flow metering apparatus of claim 7, further comprising a component configured to receive pressure signals and produce a differential pressure reading.

9. The flow metering apparatus of claim 8, further comprising a processor configured to determine a flow rate of fluid in the fluid conduit using the differential pressure reading.

10. A flow metering method, comprising:

providing a cone shaped differential pressure producer in a fluid conduit;

securing, with a support member, the cone shaped differential pressure producer to a wall of the fluid conduit;

providing at least one angled pressure port in a wall of the fluid conduit, the at least one angled pressure port being angled downstream of the cone shaped differential pressure producer;

said providing including angling the at least one angled pressure port such that the centerline of the at least one angled pressure port extends across the flow in a relatively undisturbed region;

providing at least one other pressure port;

wherein the at least one angled pressure port and the at least one other pressure port provide pressure signals;

using the pressure signals to produce a differential pressure reading; and determining a flow rate of fluid in the fluid conduit using the differential pressure reading.

11. The flow metering method of claim 10, wherein:

wherein the at least one other pressure port is a pressure port in the fluid conduit wall located upstream of the cone shaped differential pressure producer and directed at a high pressure region of the flow.

* * * * *